Patented Oct. 19, 1954

2,692,283

UNITED STATES PATENT OFFICE 2,692,283

METHOD FOR PREPARING IMINES

Vernon E. Haury, Simi, Calif., assignor to Shell Development Company, Emeryville, Calif., a corporation of Delaware No Drawing. Application November 28, 1952, Serial No. 323,161

11 Claims. (Cl. 260—566)

This invention relates to the preparation of imines. More particularly, the invention relates to a novel method for preparing new imines by reacting a ketimine with certain carbonylic compounds, and to certain novel unsaturated imines prepared thereby.

Specifically, the invention provides a new and highly efficient process for preparing new imines, such as aldimines, cyclic ketimines and keto-substituted ketimines, which comprises contacting a ketimine with a carbonylic compound of the group consisting of aldehydes and beta diketones and then separating the desired imine product from the reaction mixture. The invention further provides certain novel unsaturated imines having a conjugated system of double bonds involving three carbon atoms and the imine nitrogen atom which are produced by the above-described process.

This application is a continuation-in-part of my application, Serial No. 17,797, filed March 29, 1948, now abandoned.

The expression "aldimine" as used herein and in the appended claims refers to those compounds which are obtained by replacing the oxygen atom in the formyl group of an aldehyde with a =NR radical wherein R is an organic radical and the expression "ketimine" as used herein and in the appended claims refers to those compounds which are obtained by replacing the oxygen atom of the oxo group of a ketone with the said =NR radical.

Imines have heretofore been prepared by condensing an amino compound with a ketone or aldehyde, the reaction going forward in the presence of a condensation catalyst which is usually of the acid type. Many imines, however, cannot be prepared by this method, or at least the yield thereof is poor. In other cases, while some of the desired ketimines and aldimines are obtained by condensing the amino and carbonylic reactants, the amount of various by-products formed is so large that the process must be considered impractical of operation.

It is, therefore, an object of the invention to provide an improved process for preparing imines. It is a further object to provide a method for preparing aldimines, cyclic ketimines and keto-substituted ketimines by reacting a dissimilar ketimine with an aldehyde or beta diketone. It is a further object to provide a method whereby a ketimine and aldehyde are reacted to form an aldimine. It is a further object to provide a method for preparing novel unsaturated imines by reacting a ketimine with an unsaturated ketimine. It is a further object to provide a method whereby a ketimine and beta diketone are reacted to form a keto-substituted ketimine. It is a further object to provide a method for preparing imines that can be accomplished without the use of catalytic material. It is a further object to provide novel unsaturated imines having a conjugated system of double bonds involving three carbon atoms and the imine nitrogen atom. Other objects and advantages of the invention will be apparent from the following detailed description thereof.

It has now been discovered that these and other objects may be accomplished by the process of the invention which comprises contacting a ketimine with a carbonylic compound of the group consisting of aldehydes and beta diketones and separating the desired imine product from the reaction mixture.

When the compound reacted with the ketimine in the above-described process is an aldehyde, the resulting product will be an aldimine formed by the replacement of the radical which is attached to the nitrogen atom through a double bond in the ketimine molecule for the radical which is attached through a double bond to the oxygen atom in the formyl group of the aldehyde. This reaction may be exemplified by the following equation showing the preparation of N-(1-butylidene) propylamine by reacting N-(2-propylidene) propylamine with butyraldehyde:

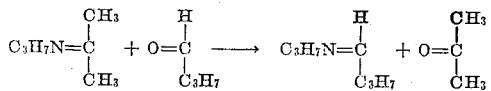

If the aldehyde reactant is an alpha,beta-ethylenically unsaturated aldehyde, such as methacrolein or crotonaldehyde, the resulting product will be an unsaturated aldimine having a conjugated system of double bonds involving three carbon atoms and the imine nitrogen atom. The production of these unsaturated aldimines may be exemplified by the following equation showing the production of N-(methallylidene) hexylamine by reacting methacrolein with N-(4-methylpent-2-ylidene) hexylamine:

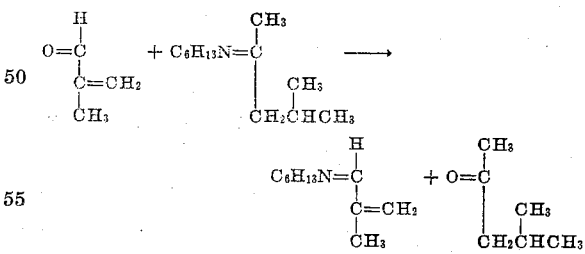

If the aldehyde reactant is acrolein or an alpha-substituted acrolein, such as methacrolein, and the ketimine reactant has the $$-\overset{\underset{\|}{NR}}{C}-$$

group attached through free bonds of the carbon atom to two separate aliphatic carbon atoms bearing two active hydrogen atoms, the reaction mixture will contain, in addition to the above-described unsaturated aldimines, an unsaturated cyclic ketimine having a conjugated system of double bonds involving three carbon atoms and the imine nitrogen atom. In fact, with acrolein, the reaction mixture contains a very large amount of this type of ketimine. These particular cyclic ketimine by-products are believed to be formed by a Michael-type addition of one of the carbon atoms attached to the imino group in the ketimine molecule with the ethylenic linkage of the unsaturated aldehyde, and then the terminal aldehyde group condenses on the remaining carbon atom attached to the imino group in the ketimine molecule by aldol condensation to form the cyclic ketimine. This reaction may be exemplified by the following equation showing the production of N-(1,3-dimethylbutyl) - 2 - isopropylcyclohexeneimine by reacting acrolein with N-(1,3-dimethylbutylidene) hexylamine:

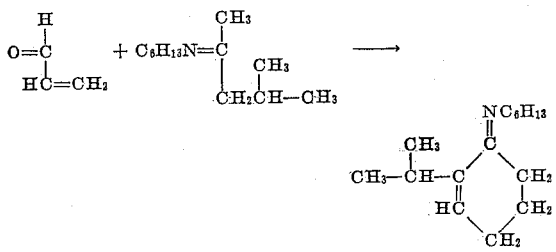

and/or

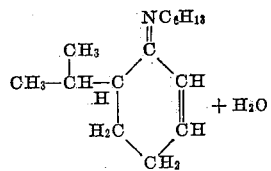

When the carbonylic reactant in the process of the invention is a beta diketone, the resulting product will be a keto-substituted ketimine formed by the replacement of the radical which is attached to the nitrogen atom through a double bond in the ketimine molecule for the radical which is attached through a double bond to the oxygen atom of the oxo group in the ketone molecule. This reaction may be exemplified by the following equation showing the preparation of N-propylimino-2-pentanone by reacting N-(2-propylidene) propylamine with acetylacetone:

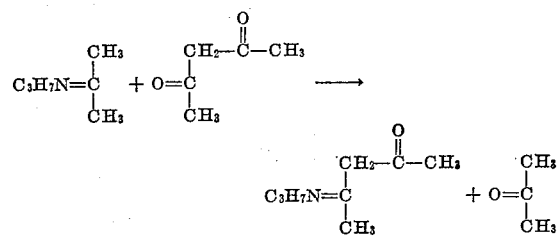

The above-described process of the invention is unobvious and could not have been foreseen. This stems in large part from the fact that the ketimine, aldehyde and ketone reactants are notably reactive compounds which, on being combined, would be expected to condense and give rise to a wide variety of reaction products other than the desired imines. High yields of from 70% to 100% of the above-described imine products, however, are not uncommon in the present process. Particularly surprising is the fact that the unsaturated aldehydes, such as acrolein, methacrolein and crotonaldehyde, react with the ketimine to produce the above-described unsaturated aldimines and cyclic ketimines having the conjugated system of double bonds involving the three carbon atoms and terminal nitrogen atom. Such a system is new and believed to be difficult if not impossible to prepare.

The ketimines used in the process of the invention are those of the formula $$RN=C\underset{R_2}{\overset{R_1}{\diagup}}$$

wherein R, $R_1$ and $R_2$ are organic radicals other than hydrogen, and are preferably hydrocarbon radicals, such as aliphatic and aromatic hydrocarbon radicals. For clarity in understanding the invention, the ketimines will be described herein and in the appended claims as substituted amines. Thus, when R, $R_1$ and $R_2$ in the above-described formula are hydrocarbon radicals, the ketimines may be generically described as N-(hydrocarbylidene) hydrocarbylamines wherein the hydrocarbylidene group is attached to the nitrogen atom through two valences of a secondary carbon atom. The expression "hydrocarbylidene" as used herein and in the appended claims refers to a hydrocarbon radical, the free bond of which consists of two valences of a single carbon atom. The expression "hydrocarbyl" as used herein and in the appended claims refers to a hydrocarbon radical, the free bond of which consists of a single valence of a single carbon atom.

Examples of ketimines that may be used in the present process include N-(2-butylidene) amylamine, N-(2-butylidene) 1-(2-chlorobutyl) amine, N-(2-isooctylidene) phenylamine, N-(2-pentylidene) nonylamine, N - (3 - cyclohexyl - 2 - butylidene) 1,3-dimethylbutylamine, N-(2-hex-4 - enylidene), 1,3 - diethylbutylamine, N - (4 - phenyl - 2 - hexylidene) cyclohexylamine, N - (4 - hexyn-2-ylidene) 1,3-diethylhexylamine, N-(3-pentylidene) naphthylamine, N-(2-octylidene) cyclohex-3-enylamine and N-(2-decylidene) 2,4-hexadienylamine.

Preferred ketimines to be used in the present process are the N-(alkylidene) alkylamines, the N-(alkylidene) alkenylamines, the N-(alkylidene) cycloalkylamines, the N - (alkylidene) arylamines, and the N-(alkylidene) alkarylamines, the N-(arylalkylidene) alkylamines, the N-(arylalkylidene) alkenylamines, the N-(arylalkylidene) cycloalkylamines, the N-(arylalkylidene) arylamines and the N-(arylalkylidene) alkarylamines, the alkylidene and arylalkylidene groups in the afore-described compounds being joined to the nitrogen atom through two valences of a single secondary aliphatic carbon atom. Examples of these preferred ketimines include N-(2-butylidene) octylamine, N-(3-octylidene) amylamine, N-(3-hexylidene allylamine, N-(2-butylidene) hex-2-enylamine, N-(2-pentylidene) phenylamine, N-(3-hexylidene) cyclohexylamine, N-(2-pentylidene) 2-methylphenylamine, N-(2-decylidene) allylamine, N-(2-butylidene) 4-isopropylphenylamine, N-(3-phenyl-2-butylidene) butylamine, N-(3-phenyl-3 - hexylidene) 1,3 - diethylbutylamine, N - (3 - phenyl-3-hexylidene) allylamine, N-(2-phenyl-3-hexylidene) cyclohexylamine, N-(3-phenyl-3-octylidene) phenylamine and N-(2-toluyl-3-hexylidene) 4-isopropylphenylamine.

Of special interest, particularly because of the ease of operation of the process, are the ketimines possessing an alkylidene group attached to the nitrogen atom, such as the N-(alkylidene) alkylamines, the N-(alkylidene) alkenylamines, the N-(alkylidene) cycloalkylamines and the N-(alkylidene) arylamines, and particularly those aliphatic ketimines of the formula

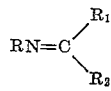

wherein R, R₁ and R₂ are alkyl radicals, preferably containing from 1 to 12 carbon atoms, and more particularly from 1 to 8 carbon atoms.

The ketimines described above may be prepared by a variety of methods known to the art. Many of them may, for example, be prepared by the conventional method of reacting a ketone with an amine such as described in U. S. 2,533,723. Many of the ketimines may also be prepared by a method related to the presently described process which is described and claimed in my copending application Serial No. 323,162, filed November 28, 1952.

The aldehydes used in the process of the invention may be aliphatic, cycloaliphatic, aromatic or heterocyclic and may be saturated or unsaturated and possess straight or branched chains. Examples of such aldehydes include propionaldehyde, butyraldehyde, isobutyraldehyde,, valeraldehyde, caproic aldehyde, heptoic aldehyde, methacrolein, acrolein crotonaldehyde, nicotinaldehyde, cinchoninaldehyde, 2-pyrancarboxaldehyde, tetrahydropyran - 2 - carboxaldehyde, 2-furaldehyde, cinnamaldehyde, p-tolualdehyde, benzaldehyde, 1-naphthaldehyde, 1-cyclohexene-1-carboxaldehyde, 4-butyl-1-cyclohexene-1-carboxaldehyde, 1-cyclopentene-1-carboxaldehyde, 2,4-heptadiene-1-carboxaldehyde and 2-isopropyl-1-cyclopentene-1-carboxaldehyde.

Preferred aldehydes to be used in the process comprise the unsubstituted hydrocarbon aldehydes, i. e., the mono-formyl substituted hydrocarbons, such as butyraldehyde, valeraldehyde, caproic aldehyde, caprylic aldehyde, crotonaldehyde, methacrolein, 2,4-heptadienal, 3,5-octadienal, cyclohexanecarboxaldehyde, 3-methyl-1-cyclohexene-2-carboxaldehyde, benzaldehyde and 4-isobutylbenzaldehyde.

Of the above group those that are particularly preferred are the aromatic aldehydes, i. e., the mono-formyl substituted aromatic hydrocarbons, which preferably contain a single 6-membered aromatic ring and no more than 18 carbon atoms, the saturated aliphatic aldehydes, i. e., the mono-formyl substituted aliphatic hydrocarbons, which preferably contain no more than 15 carbon atoms, and the substituted acroleins having a hydrocarbon radical attached to the alpha carbon atom, the beta carbon atom or both the alpha and beta carbon atoms, the hydrocarbon radical preferably containing no more than 8 carbon atoms. The aromatic aldehydes may be exemplified by benzaldehyde, tolualdehyde, 4-isohexylbenzaldehyde, 4-tert-butylbenzaldehyde, 4-isopropylbenzaldehyde, 2 - methyl - 4 - isopropylbenzaldehyde and 3-propyl-4-isoheptylbenzaldehyde. The saturated aliphatic aldehydes may be exemplified by butyraldehyde, valeraldehyde, caproic aldehyde, propionaldehyde, caprylic aldehyde, capric aldehyde, lauric aldehyde, cyclohexanecarboxaldehyde, methylcyclohexanecarboxaldehyde, cyclopentanecarboxaldehyde, 2,3-dimethylcyclopentanecarboxaldehyde, 4 - isooctylcyclohexanecarboxaldehyde, 3,5,5-trimethyl-octanal, 3-butyldodecanal and 3,5-diisopropyldecanal. The substituted acroleins may be exemplified by alpha-butyl acrolein, beta-octyl acrolein, alpha,beta-dibutyl acrolein, alpha-ethyl acrolein and alpha-isobutyl acrolein.

If the process is to be used to prepare unsaturated aldimines having a conjugated system of double bonds involving three carbon atoms and the imine nitrogen atom, the aldehyde is preferably an alpha,beta-unsaturated aliphatic aldehyde, and more preferably one of the above-described alpha, beta or alpha and beta-substituted acroleins, such as the alpha, beta and alpha and beta alkyl-substituted acroleins wherein the alkyl radical contains no more than 5 carbon atoms. If the process is to be used mainly for the preparation of the above-described unsaturated cyclic ketimines, the aldehyde reactant is preferably acrolein or any one of the above-described alpha-substituted acroleins as the alpha-alkyl-substituted acroleins wherein the alkyl radical contains no more than 5 carbon atoms.

Coming under special consideration, particularly because of the ease of operation and fine yields of products, are the aliphatic aldehydes such as those of the formula

wherein R₃ is an aliphatic hydrocarbon radical containing no more than 10 carbon atoms. Alkanals, cycloalkanals, alkenals and cycloalkenals and preferably the 2-alkenals and 2-cycloalkenals, containing no more than 8 carbon atoms are of particular value in the process.

The beta diketones used in the process to prepare the keto-substituted ketimines are those compounds having two oxo groups, i. e., two

groups, separated by a single carbon atom. Such compounds may possess aliphatic, aromatic or heterocyclic radicals, may be saturated or unsaturated and may possess straight or branched chains. Examples of such diketones include 2,4-pentanedione, 2,4-octanedione, 3,5-hexanedione, 3,5-didecanedione, 2,3-diethyl-4,6-dodecanedione, 2 - ethylhexanedione - 3,5,6 - phenyl - 2,4 - hexanedione, 2-acetyl-1-cyclohexanone, 2,3-dibutyl-4,6-decanedione and 6-decenedione-3,5.

Preferred diketones to be used in the process comprise the hydrocarbyl beta diketones, i. e., the beta diketo-substituted hydrocarbons, such as those of the formula

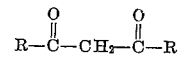

wherein R is a hydrocarbon radical, as 2,4-pentanedione, 2,4-heptanedione, 2,4-decanedione, 3,5 - hexanedione, 2,3 - diethyl - 4,6 - dodecanedione and 6-phenyl-2,4-hexanedione. Of this group, those that are particularly preferred are the diketo-substituted aliphatic hydrocarbons, such as the alkanediones, the alkenediones, the cycloalkanediones and the cycloalkenediones, which preferably contain no more than 12 carbon atoms.

Of special interest, particularly because of the ease of operation of the process are the diketones of the formula

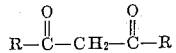

wherein one R is an aliphatic open-chain hydrocarbon radical containing from 1 to 3 carbon atoms and the other R is an aliphatic open-chain hydrocarbon radical containing no more than 6 carbon atoms. Alkanediones and alkenediones containing no more than 8 carbon atoms are of special value in the process.

In the operation of the process, any of the above-described ketimines may be reacted with any of the above-described carbonylic compounds. As indicated above, the product obtained in each case will depend on the type of carbonylic compound used as the reactant. If the aldehydes are used as reactants, the products will be aldimines. If the aldehyde is an alpha, beta-ethylenically unsaturated aldehyde and if the aldehyde is acrolein or an alpha-substituted acrolein, the product will contain, in addition to the aldimines, an unsaturated cyclic ketimine. Thus, acetaldehyde may be reacted with N-(4-methylpent-2-ylidene) isopropylamine to produce N-(ethylidene) isopropylamine, butyraldehyde may be reacted with N-(2-propylidene) propylamine to produce N-(1-butylidene) propylamine, methacrolein may be reacted with N-(1,3-dimethylbutylidene) 1,3-dimethylbutylamine to produce N-(1-methylallylidene) 1,3-dimethylbutylamine as well as some N-(1,3-dimethylbutyl)-2-isopropyl-4-methycyclohexeneimine and crotonaldehyde may be reacted with N-(1,3-dimethylbutylidene)-1,3-dimethylbutylamine to produce N-(1-crotylidene) 1,3-dimethylbutylamine.

When the diketones are used as the carbonylic reactant, the products will be keto-substituted ketimines. Thus, acetylacetone may be reacted with N-(2-propylidene) isopropylamine to produce 4-isopropylimino-2-pentanone, 2,4-heptanedione may be reacted with N-(2-butylidene) hexylamine to produce 2-hexylimino-4-heptanone and acetylacetone may be reacted with N-(2-propylidene) octylamine to produce 4-octylimino-2-pentanone.

The reaction between the aforedescribed ketimines and carbonylic compounds is accomplished by merely bringing the components together in a suitable reaction chamber. The ketimines and the carbonylic compounds may be combined with either one or both in stoichiometric excess, such as from 1 to 3 mols of the one compound for every mol of the other. Generally speaking, however, the most advantageous results in respect to the yield of imine product are obtained through use of the reactants in the mol for mol proportions which are theoretically required.

The reaction between the ketimine and carbonylic compounds is exothermic in character and proceeds without the application of external heat. However, in some instances it is desirable to apply some heat in order to increase the speed of the reaction. It may also be desirable in some instances to apply sufficient heat to remove one or more of the products of reaction by distillation. Such a removal, however, is not essential to a successful operation of the process. In general, temperatures used in the process may vary from 30° C. to 200° C., and more preferably from 50° C. to 150° C.

The reaction is preferably conducted at atmospheric pressure, but in some instances it may be desirable to use superatmospheric or subatmospheric pressure.

The process may be conducted in the presence or absence of catalytic material. In some instances, it may be desirable to speed the reaction by adding catalytic material, such as an acid-acting salt, as zinc chloride, as well as acids such as hydrochloric and sulfuric acid, orthophosphoric acid and benzene-sulfonic acid. In general, an amount of catalyst ranging from 0.01% to 5%, and preferably from 0.5% to 1%, based on the weight of the ketimine reactant, represents a suitable amount when carrying on the process of the invention in the liquid phase and in a batchwise manner. However, it should be noted that in the preferred practice of the invention, no catalyst is employed.

The process of the invention may be carried out in the presence or absence of solvents or diluents. In general, however, solvents or diluents are not employed as both the ketimine, aldehyde and diketone reactants as well as the imine and ketone products, are normally liquid at the temperature employed. If a solvent or diluent is used, as to place the mixture in a more fluid condition, it should be a material which is both liquid and inert under the prevailing reaction conditions. Materials which may be used for this purpose are, for example, isooctane, xylene, dioxane and diethylene glycol diethyl ether.

The time required for the reaction will vary over a considerable range depending on the type of reactants used in the process, use of catalytic materials as described hereinafter and the temperature selected. In most instances, at the lower temperatures and in the absence of catalytic material, the reaction may take considerable time, e. g., from 1 to 20 hours. If higher temperatures and/or catalysts are used, the reaction may generally be accomplished in a much shorter period, e. g., from 1 to 5 hours.

After the reaction is complete, the imine product is separated from the other components of the mixture of which it forms a part by any convenient manner. A preferred separation method is that of fractional distillation, at reduced pressure if necessary, as the imines are normally stable materials that can be volatilized without decomposition. However, other methods of separation may be used.

The process of the invention may be carried out in a batchwise, continuous or semi-continuous manner. For batch treatment, the ketimine and carbonylic reactants are preferably added to a suitable vessel where they are allowed to react and then at the completion of the reaction, the desired imine product is removed from the mixture, preferably by distillation. If a continuous operation is desired, it is preferably accomplished by adding the ketimine and carbonylic compound continuously or intermittently to the reaction vessel as the reaction progresses and continuously removing the imine product and/or ketone by distillation.

To illustrate the manner in which the invention may be carried out, the following examples are given. It is to be understood, however, that the examples are for the purpose of illustration

Example I

This example illustrates the reaction between a ketimine and a beta diketone to produce a keto-substituted ketimine and a new ketone.

Approximately one mol of N-(2-propylidene) isopropylamine was combined with approximately 1 mol of acetylacetone in a glass reaction flask at room temperature. These materials reacted rapidly and in 10 minutes the temperature had increased to 60° C. After the reaction was complete, the mixture was distilled to recover 0.77 mol of 4-isopropylimino-2-pentanone and 0.95 mol of acetone. The 4-isopropylimino-2-pentanone had a boiling point of 104° C. to 105° C. at 20 mm. Hg.

In a similar manner, 5-butylimino-3-hexanone is produced by reacting N-(2-butylidene) butylamine with 2,4-hexanedione and 6-hexylimino-4-heptanone is produced by reacting N-(2-butylidene) hexylamine with 2,4-heptanedione.

Example II

This example illustrates the reaction between a ketimine and an aldehyde to produce an aldimine and a new ketone.

Approximately 2 mols of N-(1,3-dimethylbutylidene) isopropylamine was combined with 2 mols of acetaldehyde in a glass reaction flask and the mixture distilled. At 53° C. to 61° C. there was collected 1.47 mols of N-(ethylidene) isopropylamine and 1.95 mols of methyl isobutyl ketone.

In a similar manner, N-(1-butylidene) propylamine is obtained by reacting N-(2-propylidene) propylamine with butyraldehyde, and N-(1-propylidene) hexylamine is obtained by reacting N-(2-butylidene) hexylamine with propionaldehyde.

Example III

This example illustrates the reaction between a ketimine and an alpha, beta-unsaturated aldehyde to produce an aldimine having a conjugated system of double bonds involving three carbon atoms and a nitrogen atom.

One mol of methacrolein was mixed with one mol of N-(1,3-dimethylbutylidene) 1,3-dimethylbutylamine and the mixture allowed to stand overnight. The mixture was then warmed to 50° C. for 4 hours before distillation. On distillation, a fraction weighing 127 parts was collected in the temperature range of 46° C. to 50° C. (10 mm.) which proved to be N-(1-methallylidene) 1,3-dimethylbutylamine. This amount corresponded to an 83% conversion to product. The latter compound had a refractive index ($n20/D$) of 1.455 and a specific gravity (20/4) of 0.7845. At 200° C. N-(1-methallylidene) 1,3-dimethylbutylamine gave a 17% conversion to dimer.

A higher boiling product (74–77° C. at 0.5 mm.) obtained from the above-described distillation was identified as N-(1,3-dimethylbutyl) 2-isopropyl-4-methylcyclohexeneimine. Anal. Calcd.: C, 81.63; H, 12.42; N, 5.95; neut. equiv. 235. Found: C, 80.66; H, 12.31; N, 5.82; neut. equiv., 238.

Example IV

A mixture of 137 parts of N-(1,3-dimethylbutylidene) 1,3-dimethylbutylamine and 53 parts of crotonaldehyde was mixed in a glass reaction vessel and allowed to stand overnight. The resulting mixture was then distilled. Over 79 parts of N-(crotylidene) 1,3-dimethylbutylamine was recovered at approximately 55° C. (10 mm. Hg). This yield corresponded to a 68% conversion to product.

In a similar manner, N-(1-crotylidene) hexylamine is obtained by reacting N-(2-propylidene) hexylamine with crotonaldehyde and N-(1-crotylidene) phenylamine is obtained by reacting N-(2-butylidene) phenylamine with crotonaldehyde.

Example V

Approximately two mols of N-(1,3-dimethylbutylidene) 1,3-dimethylbutylamine is combined with approximately 2 mols of benzaldehyde in a glass reaction vessel. The mixture is allowed to stand overnight and is then heated at 50° C. for 4 hours. Distillation of the resulting mixture yields N-(benzylidene) 1,3-dimethylbutylamine.

N-(toluylidene) octylamine is prepared in a similar manner by replacing the benzaldehyde in the above-described process with tolualdehyde.

Example VI

Approximately one mol of N-(2-propylidene) octylamine is combined with approximately one mol of 2-acetyl-1-cyclohexanone in a glass reaction flask at room temperature. After standing for 24 hours, the mixture is heated at 40° C. When the reaction is complete, the mixture is distilled to yield 2-(octylimino-1-ethyl) cyclohexanone.

Example VII

A mixture of about 1 mol of N-(2-hexylidene) cyclohexylamine and about 2 mols of tetrahydrobenzaldehyde is allowed to stand overnight. The mixture is then heated at 50° C. when the reaction is complete, the mixture is distilled to yield N-(tetrahydrobenzylidene) cyclohexylamine.

In a similar manner, N-(tetrahydrobenzylidene) pentylamine is obtained by reacting N-(2-butylidene) pentylamine with tetrahydrobenzaldehyde and N-(tetrahydrobenzylidene) isopropylamine is obtained by reacting N-(2-butylidene) isopropylamine with tetrahydrobenzaldehyde.

Example VIII

This example illustrates the use of the process in preparing cyclic ketimines from acrolein and N-(1,3-dimethylbutylidene) 1,3-dimethylbutylamine.

One mol of acrolein was mixed with one mole of N-(1,3-dimethylbutylidene) 1,3-dimethylbutylamine. The mixture warmed slowly but was held at 35–40° C. by cooling for one hour. At this time, the unused N-(1,3-dimethylbutylidene) 1,3-dimethylbutylamine was removed by distillation and the residue acidified and extracted with ether. The ether extract was discarded. The amines were liberated with sodium hydroxide and extracted with ether. The ether extract was dried and distilled to give N-(1,3-dimethylbutyl)-2-isopropylcyclohexenimine boiling at 84–5° C. (1 mm.). Anal. Calcd.: C, 81.4; H, 12.3; N, 6.3; neut. equiv. 221. Found: C, 80.9; H, 12.4; N, 6.3; neut. equiv. 224.

I claim as my invention:

1. A process for preparing an imine which comprises contacting a ketimine of the formula

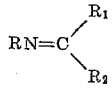

wherein $R_1$ and $R_2$ are alkyl radicals containing from 1 to 8 carbon atoms and R is a member of the group consisting of alkyl, alkenyl, cycloalkyl and aryl radicals containing no more than 8 carbon atoms, with a carbonylic compound of the group consisting of monoaldehydes

wherein $R_3$ is an aliphatic hydrocarbon radical containing no more than 10 carbon atoms and diketones of the formula

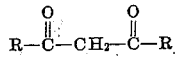

wherein one R is an aliphatic open-chain hydrocarbon containing from 1 to 3 carbon atoms and the other R is an aliphatic open-chain hydrocarbon radical containing no more than 6 carbon atoms, and recovering the desired imine product from the reaction mixture.

2. A process for preparing an imine which comprises contacting a ketimine of the formula

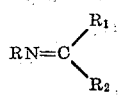

wherein R, $R_1$ and $R_2$ are alkyl radicals containing from 1 to 8 carbon atoms, with a carbonylic compound of the group consisting of monoaldehydes

wherein $R_3$ is an aliphatic hydrocarbon radical containing no more than 10 carbon atoms and diketones of the formula

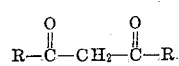

wherein one R is an aliphatic open-chain hydrocarbon containing from 1 to 3 carbon atoms and the other R is an aliphatic open-chain hydrocarbon radical containing no more than 6 carbon atoms, in a molar ratio varying from 3:1 to 1:3 at a temperature between 20° C. and 100° C., and subsequently recovering the desired imine product from the reaction mixture.

3. A process for preparing an imine which comprises contacting a ketimine of the formula

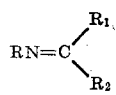

wherein R, $R_1$ and $R_2$ are alkyl radicals containing from 1 to 8 carbon atoms, with a monoaldehyde of the formula

wherein $R_3$ is an aliphatic hydrocarbon radical containing no more than 10 carbon atoms in a molar ratio varying from 3:1 to 1:3 at a temperature between 20° C. and 100° C., said reaction proceeding in an exothermic manner on mixing the reactants and without the necessary application of heat, and subsequently recovering the desired imine product from the reaction mixture.

4. The method as defined in claim 3 wherein the monoaldehyde reactant is methacrolein.

5. The method as defined in claim 3 wherein the monoaldehyde reactant is isobutyraldehyde.

6. The method as defined in claim 3 wherein the monoaldehyde reactant is crotonaldehyde.

7. The method as defined in claim 3 wherein the monoaldehyde reactant is acrolein.

8. A process for preparing an imine which comprises contacting a ketimine of the formula

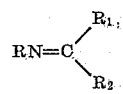

wherein R, $R_1$ and $R_2$ are alkyl radicals containing from 1 to 8 carbon atoms, with a diketone of the formula

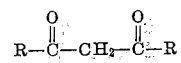

wherein one R is an aliphatic open-chain hydrocarbon containing from 1 to 3 carbon atoms and the other R is an aliphatic open-chain hydrocarbon radical containing no more than 6 carbon atoms in a molar ratio varying from 3:1 to 1:3, whereby there is an exchange of the alkylidene group in the said ketimine molecule for the hydrocarbon group attached to the carbonylic oxygen atom through double bonds in the diketone reactant to form a keto-substituted ketimine and a monoketone, said reaction proceeding in an exothermic manner on mixing the reactants and without the necessary application of heat, and subsequently recovering the desired keto-substituted ketimine product from the reaction mixture.

9. The method as defined in claim 8 wherein the diketone reactant is acetylacetone.

10. The method as defined in claim 8 wherein the ketimine reactant is N-(butylidene) butylamine.

11. A process for preparing an aldimine which comprises reacting a ketimine of the formula

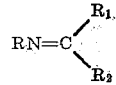

wherein R, $R_1$ and $R_2$ are alkyl radicals containing from 1 to 8 carbon atoms, with an approximately equal molar amount of a monoaldehyde

wherein $R_3$ is an aliphatic hydrocarbon radical containing no more than 10 carbon atoms at a temperature between 20° C. and 150° C. whereby there is an exchange of the alkylidene group in the said ketimine reactant for the group in the monoaldehyde which is attached through a double bond to the oxygen atom so as to form an aldimine and a ketone product, and subsequently removing the aldimine from the reaction mixture.

References Cited in the file of this patent

UNITED STATES PATENTS

| Number | Name | Date |
|---|---|---|
| 1,619,953 | North | Mar. 8, 1927 |
| 1,639,957 | North | Aug. 23, 1927 |
| 1,726,713 | North | Sept. 3, 1929 |
| 1,780,149 | Powers | Oct. 28, 1930 |
| 2,319,848 | Clark | May 25, 1943 |
| 2,421,937 | Haury | June 10, 1947 |
| 2,535,922 | Haury | Dec. 26, 1950 |

FOREIGN PATENTS

| Number | Country | Date |
|---|---|---|
| 365,214 | Great Britain | Jan. 21, 1932 |